United States Patent
Ricaud (10) Patent No.: US 7,163,178 B2
(45) Date of Patent: Jan. 16, 2007

(54) SEAT RAIL FOR AIRCRAFT CABIN AND METHOD OF MANUFACTURING SUCH A RAIL

(75) Inventor: Alexandre Ricaud, Grisolles (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/047,705

(22) Filed: Feb. 2, 2005

(65) Prior Publication Data

US 2005/0211844 A1    Sep. 29, 2005

(30) Foreign Application Priority Data

Feb. 13, 2004    (FR) ................... 04 50264

(51) Int. Cl.
B64C 1/20 (2006.01)
B64C 1/22 (2006.01)
B64D 47/00 (2006.01)
B64D 11/06 (2006.01)

(52) U.S. Cl. ............... 244/118.1; 244/117 R; 244/118.6; 248/503.1

(58) Field of Classification Search ............ 244/117 R, 244/118.1, 118.6, 119, 122 R; 52/729.1, 52/8; 248/188.1, 503.1, 424, 429; 403/121, 403/157, 150, 79; 114/76
See application file for complete search history.

(56) References Cited

U.S. PATENT DOCUMENTS

| | | | | |
|---|---|---|---|---|
| 3,457,698 A | * | 7/1969 | Albers ................. | 52/223.7 |
| 3,648,419 A | * | 3/1972 | Marks .................. | 52/36.6 |
| 4,297,825 A | * | 11/1981 | Harper, Jr. ............ | 52/729.1 |
| 4,471,867 A | * | 9/1984 | Forshee ................ | 198/687 |
| 4,479,621 A | | 10/1984 | Bergholz | |
| 4,570,390 A | * | 2/1986 | Wendt .................. | 52/36.6 |
| 4,594,822 A | * | 6/1986 | Marschak .............. | 52/91.1 |
| 4,694,531 A | * | 9/1987 | Foy .................... | 16/87.4 R |
| 5,301,914 A | | 4/1994 | Yoshida et al. | |
| 5,509,250 A | * | 4/1996 | Jensen et al. .......... | 52/200 |
| 5,553,437 A | * | 9/1996 | Navon .................. | 52/729.1 |
| 6,068,214 A | | 5/2000 | Kook et al. | |
| 6,554,225 B1 | * | 4/2003 | Anast et al. ........... | 244/117 R |
| 6,824,104 B1 | * | 11/2004 | Smallhorn ............. | 244/118.5 |

FOREIGN PATENT DOCUMENTS

| | | |
|---|---|---|
| DE | 44 19 139 A1 | 12/1995 |
| EP | 0 463 757 A2 | 1/1992 |
| EP | 0 853 039 A2 | 7/1998 |

* cited by examiner

*Primary Examiner*—Teri Pham Luu
*Assistant Examiner*—Joshua Michener
(74) *Attorney, Agent, or Firm*—Oblon, Spivak, McClelland, Maier & Neustadt, P.C.

(57) ABSTRACT

This invention relates to a seat rail (8) for an aircraft cabin, the rail comprising a web (22) located between a top flange (24) and a bottom flange (26) with an outer surface (26a) and an inner surface (26b) fixed to the web. According to the invention, the rail is also equipped with several connection devices (20) designed for its attachment onto an aircraft structure, and being made in a single piece with the web and the top and bottom flanges, each connection device (20) having at least one through orifice (32) and projecting from the outer surface (26a).

12 Claims, 6 Drawing Sheets

FIG. 1

PRIOR ART

SEAT RAIL FOR AIRCRAFT CABIN AND METHOD OF MANUFACTURING SUCH A RAIL

TECHNICAL DOMAIN

This invention relates to a seat rail installed on an aircraft cabin floor in general, and a method of manufacturing such a rail.

STATE OF PRIOR ART

This type of rail is well known in prior art. Conventionally it comprises a web located between a top flange and a bottom flange, the top flange being fixed to means of fastening seats.

In a known manner, seat rails are assembled fixed to the aircraft structure below the floor, so as to provide a mechanical support on these same rails. In this respect, note that support is obtained using several attachment assemblies arranged at a spacing from each other along the rail, these assemblies usually comprising a rod connecting the aircraft structure to the web of the rail.

Figure 1:
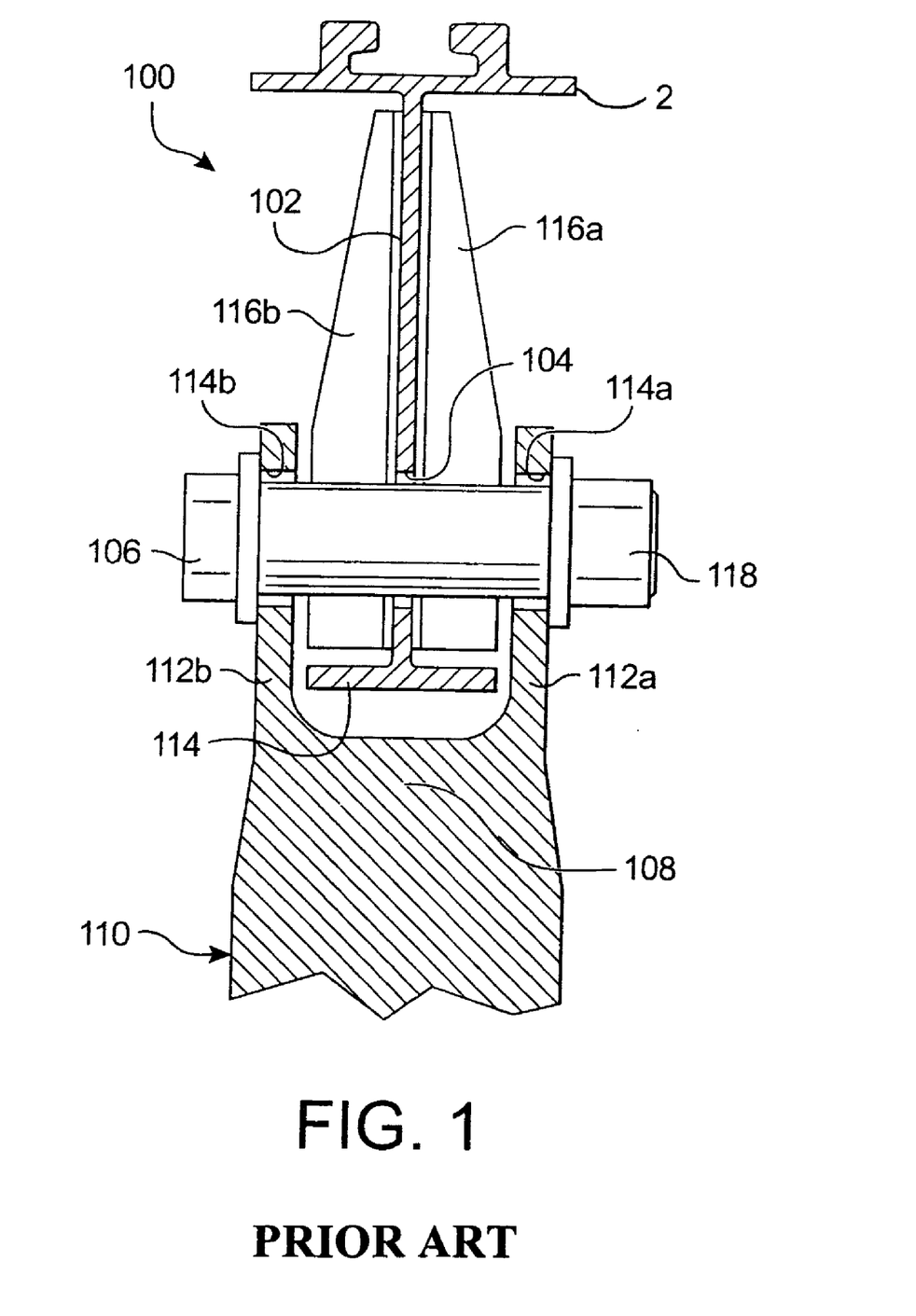
FIG. 1 already described, shows a cross sectional view of a seat rail for an aircraft cabin according to prior art, the rail being shown in cooperation with a part of an attachment assembly for assembling this rail onto an aircraft structure.

With reference to FIG. 1, a solution is known in prior art consisting of providing a seat rail 100 in which the web 102 is provided with several orifices 104 (only one is shown on the figure), these orifices being treated like rail anchor points to the extent that a pin 106 passes through each anchor point and also passes through a clevis-shaped end 108 of the connecting rod 110 belonging to a given attachment assembly.

It is clear from the above that the two heads 112a, 112b of the clevis 108 must be sufficiently far from each other to enable passage of the lower flange 114 between them, insertion of this flange 114 between the two heads 112a, 112b being essential to enable the orifices 114a, 114b, provided on these same heads, to be in line with the orifice 104 formed in the web 102 of the rail 100.

The consequence of such an assembly is that the two heads 112a, 112b of the end of the rod in the shape of a clevis 108 are widely separated and at a distance from the web 102, which in particular requires additional spacer plates 116a, 116b between each of the heads 112a, 112b and this web 102, with the purpose of obtaining a stack of elements in contact in pairs. With this configuration, it is then possible to correctly clamp a nut 118 onto the above mentioned pin 106.

Although this solution does enable satisfactory installation of the rail on the aircraft structure, the associated attachment assembly for each anchor point on the rail includes a very large number of parts which is extremely disadvantageous in terms of the associated mass. In this respect, note that the above-mentioned disadvantage related to the mass of attachment assemblies is particularly restrictive because the number of anchor parts on aircraft may be extremely high, for example more than two hundred. Consequently, the same number of attachment assemblies has to be provided to assemble the seat rails on the aircraft structure.

Furthermore, the large number of parts required to make up attachment assemblies also has disadvantages such that the installation time and costs of these assemblies are very high.

Furthermore, the many metallic parts in contact are naturally subject to galvanic corrosion. This then makes it necessary to apply protecting layers during assembly, which further increase the rail installation time on the aircraft structure.

Note also that seat rails for aircraft cabins usually are long, usually more than 5 m, and possibly 10 m or more. Nevertheless, it is still necessary to install fish plates on several rails so that they jointly form segments extending over a longer length, sometimes nearly as long as the total length of the aircraft cabin. It is obvious that the parts of the attachment assembly located at the web of a rail end significantly complicate fish plating applied onto an adjacent rail.

OBJECT OF THE INVENTION

The invention is intended to propose a seat rail for an aircraft cabin, in which the design at least partially overcomes the disadvantages mentioned above related to embodiments according to prior art.

Furthermore, the purpose of this invention is to propose a method of manufacturing such a seat rail.

To achieve this, the first object of the invention is a seat rail for an aircraft cabin, the rail comprising a web located between a top flange and a bottom flange with an outer surface and an inner surface fixed to the web, said top flange also being provided with an outer surface and an inner surface fixed to the web, the outer surface of the top flange being fixed to seat attachment means. According to the invention, the rail is also equipped with several connection devices designed for its attachment onto an aircraft structure, and being made in a single piece with the web, the top and bottom flanges and the seat attachment means, each connection device having at least one through orifice projecting from the outer surface of the bottom flange.

Thus, the seat rail connection devices according to the invention form anchor points which, unlike in prior art, are located at a distance from the web of the rail since they are separated from this web by the bottom flange.

The relative advantage of such a configuration is that attachment assemblies for the installation of the rail onto the aircraft structure no longer need to cooperate with the web of the rail and consequently no longer need to be designed as a function of the geometry of the bottom flange as was the case in the past. Thus, the design of these attachment assemblies can be simplified and the number of component parts reduced such that gains in terms of cost, mass and installation time can advantageously be obtained. For example, when an attachment assembly comprises a rod with a clevis-shaped end, this end may then be installed directly on the connection device located below the web, under the bottom flange, without it being necessary to insert additional plates as shown on FIG. 1 according to prior art.

Furthermore, the rail web is not intended to be fitted with parts belonging to attachment assemblies, consequently fish plating operations are easier.

Moreover, the fact that the connection devices are made in a single piece with the web and top and bottom flanges reduces the installation time of the rail on the aircraft structure, and also limits the number of parts affected by galvanic corrosion.

Furthermore, this embodiment in which the seat rail is in a single piece advantageously implies that when the connection devices are approximately in line with the web, the forces passing through these connection devices then propagate directly into the web of the rail, without any risk of deforming the free lateral ends of the bottom flange.

Preferably, each connection device is a tenon, for example designed to cooperate with a clevis of an attachment assembly connecting the rail to the aircraft structure, or a clevis, for example intended to cooperate with a tenon in such an attachment assembly. In both proposed cases, the simple installation of a pin passing through the tenon and the clevis mentioned above advantageously provides a mechanical connection between the rail and the connecting rod of a given attachment assembly.

Preferably, the top flange is provided with an outer surface and an inner surface fixed to the web, this outer surface being fixed to seat attachment means, which are preferably made in a single piece with the web, the top and bottom flanges and the connection devices.

Another object of the invention is a method of manufacturing a seat rail for an aircraft cabin like that described above and also the subject of this invention, this method comprising the following steps:

manufacturing of a single piece assembly comprising the web, the top and bottom flanges, and a plate parallel to the web and projecting from the outer surface of the bottom flange; and machining of the plate so as to eliminate portions of the plate, and to show up several connection devices.

Other advantages and characteristics of the invention will become clearer from the detailed non-limitative description given below.

BRIEF DESCRIPTION OF THE FIGURES

This description will be made with reference to the appended figures, wherein.

DETAILED PRESENTATION OF PREFERRED EMBODIMENTS

Figure 2:
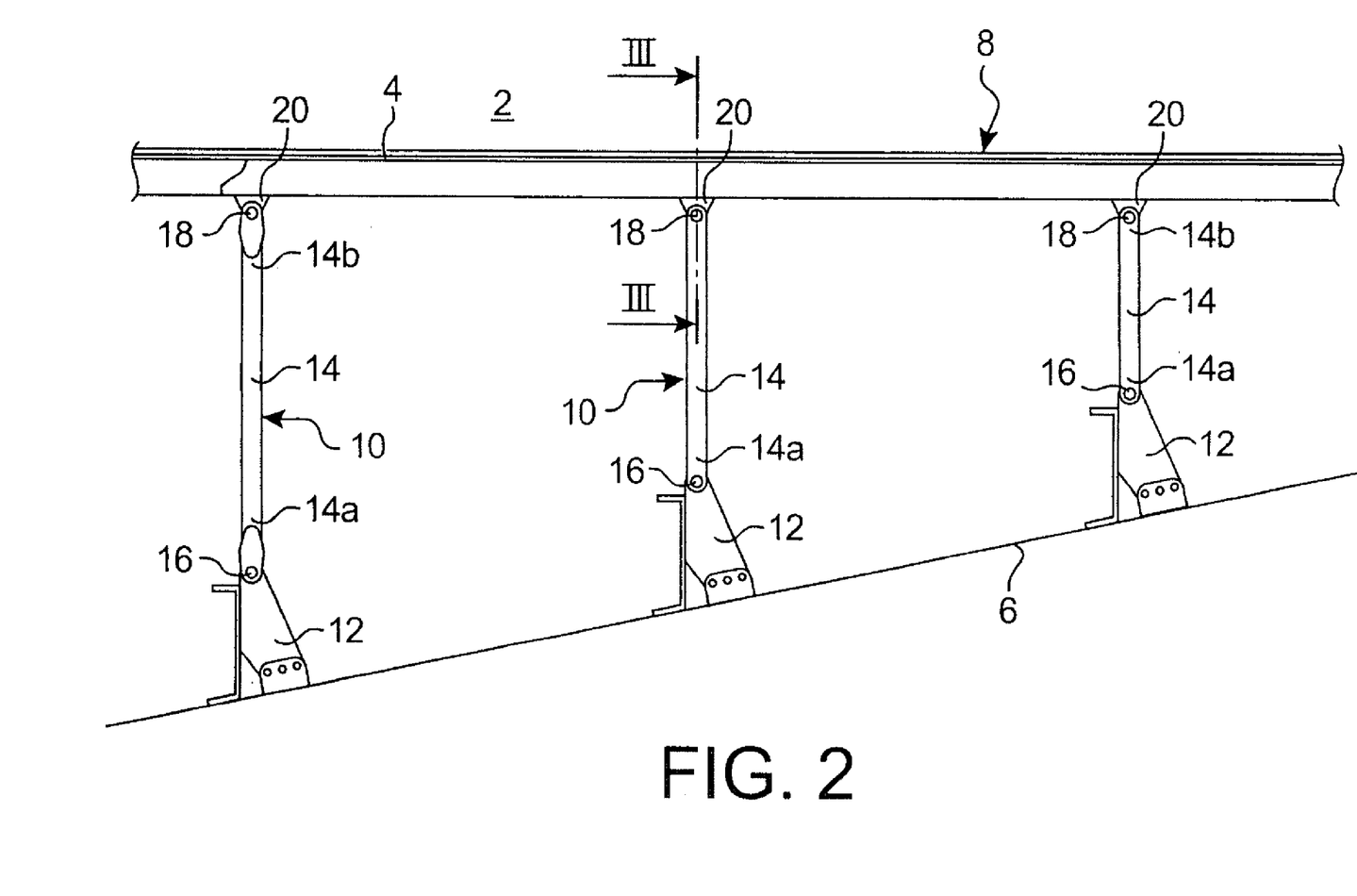
FIG. 2 shows a side view of a part of a seat rail for an aircraft cabin according to a preferred embodiment of this invention, the rail being installed free to cooperate with several attachment assemblies assembling this rail onto a structure of the aircraft also shown partially.

With reference to FIG. 2, the figure briefly shows part of an aircraft (not referenced) including a cabin 2, a cabin floor 4, and a lower structure 6 of the aircraft.

The figure also shows a seat rail 8 according to a preferred embodiment of this invention, this rail 8 being arranged on the floor 4. In this respect, note that a single rail 8 is visible on FIG. 2, but the floor 8 is actually fitted with several rails arranged parallel to each other, and for some along the same line as each other in order to obtain longer segments by fish plating. For example, the seat rail 8 may be approximately 5 m long, and may be made so as to be 10 m long or more.

The seat rail 8 according to the preferred embodiment described is installed rigidly on the aircraft structure 6 located below the floor 4, through several attachment assemblies 10 at a spacing along rail 8. For example, two attachment assemblies 10 directly consecutive to each other and associated with the rail 8 may be installed at a spacing of between about 500 and 800 mm.

As can be clearly seen on FIG. 2, each attachment assembly 10 comprises a fitting 12 installed fixed on the lower structure 6, and a connecting rod 14 preferably arranged approximately perpendicular to the floor 4, this connecting rod 14 having a lower end 14a installed free to pivot on the fitting 12, using a pin 16.

Furthermore, the connecting rod 14 of the attachment assembly 10 also comprises a top end 14b that is fixed free to pivot using a pin 18 on a connection device 20 forming an integral part of the rail 8, as will be described in more detail below.

Note that all attachment assemblies 10 of the seat rail 8 are preferably designed as has just been described, and all that changes is the length of the connecting rods 14 depending on the spacing between the structure 6 and the connection device 20 concerned, as can be clearly seen on FIG. 2.

Figure 3:
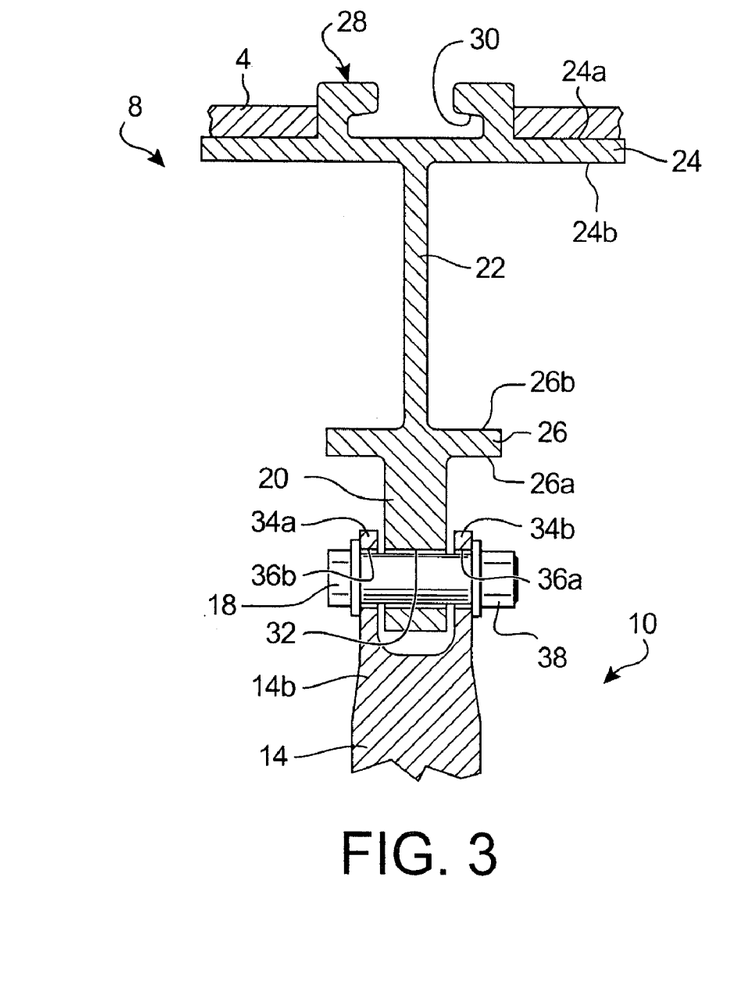
FIG. 3 shows a sectional view along the line III—III in FIG. 2.

Now with reference to FIG. 3, the seat rail 8 comprises a web 22 perpendicular to the floor 4, this web 22 being located between a top flange 24 and a bottom flange 26, the two flanges 24 and 26 being parallel to the floor 4 of the aircraft cabin 2.

More precisely, the top flange 24 comprises an outer surface 24a on which conventional attachment means of the seat 28 are provided, namely defining a groove 30 inside which seat legs may be installed by sliding.

The top flange 24 also comprises an inner surface 24b fixed to the web 22. In other words, the inner surface 24b sets up the junction between the web 22 and the top flange 24 of the seat rail 8.

Furthermore, the bottom flange 26 comprises an outer surface 26a on which the attachment devices 20 are arranged that can be used as anchor points for the rail 8 in the structure 6 (only one device 20 being shown on FIG. 3), these devices 20 actually projecting from the outer surface 26a. The bottom flange 26 also comprises an inner surface 26b fixed to the web 22.

A special feature of the invention is that the web 22, the flanges 24, 26, the connection devices 20 and preferably also the attachment means 28, jointly form an assembly made in a single piece, for example aluminium or an aluminium alloy.

As can be seen on FIG. 3, the connection devices 20 are located below the lower bottom flange 26, since the rail 8 may be considered by superposition of seat attachment means 28, the top flange 24, the web 22, the bottom flange 26, and attachment devices 20 at a spacing from each other along this rail 8, in the order given. Furthermore, in this preferred embodiment, each connection device is located along the same plane as the web 22, and under the web. In other words, even if the connection devices 20 may not be the same thickness as the web 22, these elements 20 and 22 are arranged approximately in the same plane perpendicular to the floor 4.

The connection devices 20 shown on FIGS. 2 and 3 are in the form of a tenon, preferably flat and triangular, each being provided with a through orifice 32. As mentioned above and as visible on FIG. 3, the tenon 20 is effectively located in the same plane (not shown) as the web 22, such that it forms the geometric extension of this web.

In this preferred embodiment of the present invention, the choice of a tenon to form the connection device 20 is made due to the fact that the connecting rod 14 of the associated attachment assembly 10 has a clevis shaped top end 14*b*. In this way, the clevis 14*b* is provided with two heads 34*a*, 34*b* with a spacing close to the thickness of the tenon 20, and in which two orifices 36*a*, 36*b* provided on these heads 34*a*, 34*b* respectively, are in line with the through orifice 32, so that the pin 18 can pass through them and also this orifice 32. The mechanical connection between the tenon 20 and the clevis 14*b* can the be finalized by screwing a nut 38 onto the end of the pin 18, which bears on the outside on one of the two heads 34*a*, 34*b*, the nut 38 bearing on the outside on the other of the two heads 34*a*, 34*b*.

Figure 3A:
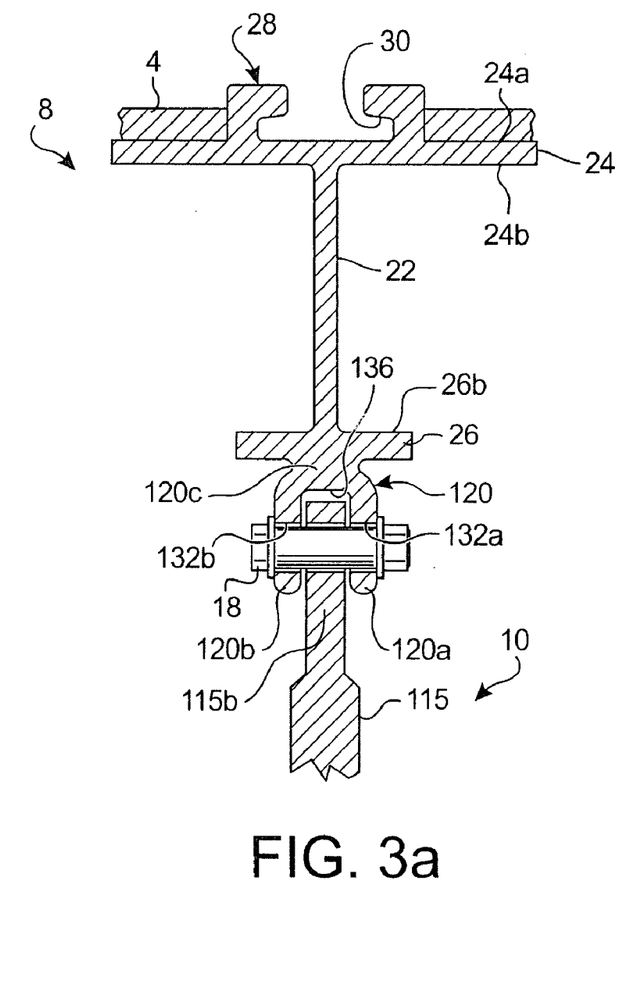
FIG. 3a shows a view similar to the view in FIG. 3, the seat rail being in an alternative form to the preferred embodiment shown on FIGS. 2 and 3.

FIG. 3*a* shows a seat rail 8 according to an alternative to the preferred embodiment that has just been described. This rail 8 in FIG. 3*a* is approximately identical to the rail 8 in FIGS. 2 and 3, and note in this respect that elements of the figures marked with the same numeric references correspond to identical or similar elements.

In this alternative, only the connection device 120 is different from the connection device 20 described above. The device 120 is in the form of a clevis located along the geometric prolongation of the web 22 and below the web, still being separated from it by the bottom flange 26. In other words, the clevis 120 comprises a base 120*c* located in the same plane as the web 22, starting from which two clevis heads 120*a*, 120*b* extend located on each side of the above mentioned plane and parallel to it.

This configuration is used when the attachment assembly 10 associated with the device 120 comprises a connecting rod 115 for which the top end 115*b* is in the form of a tenon. The tenon 115*b* is approximately the same thickness as the spacing of the heads 120*a*, 120*b* and can be assembled on the clevis 120 using a pin 18, this pin passing through two through orifices 132*a*, 132*b* provided on heads 120*a*, 120*b*, respectively, and an orifice 136 formed in the tenon 115*b* of the connecting rod 115.

Figure 4:
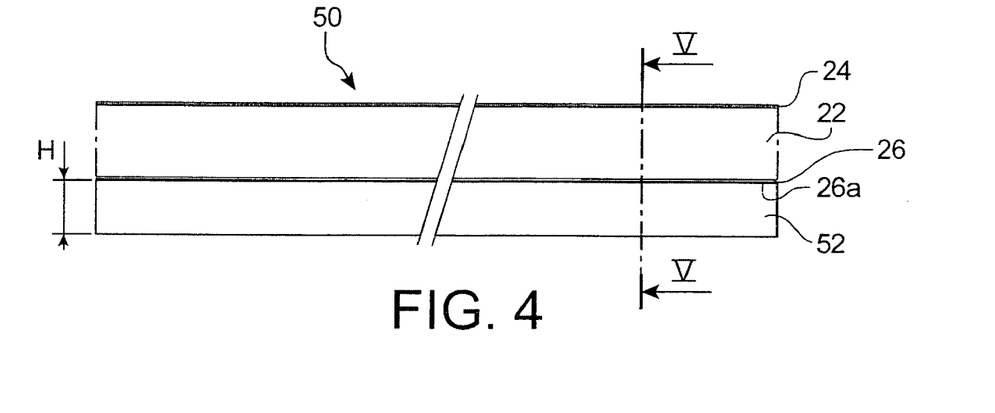
FIG. 4 shows a side view of a single piece assembly made during use of a first preferred embodiment of the method of manufacturing a seat rail according to the invention.
Figure 5:
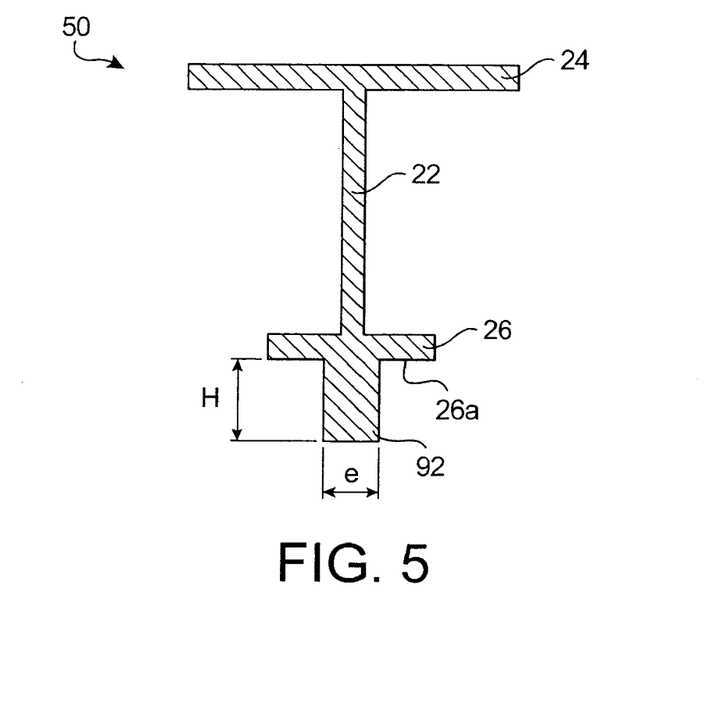
FIG. 5 shows a sectional view taken along line V—V in FIG. 4.
Figure 6:
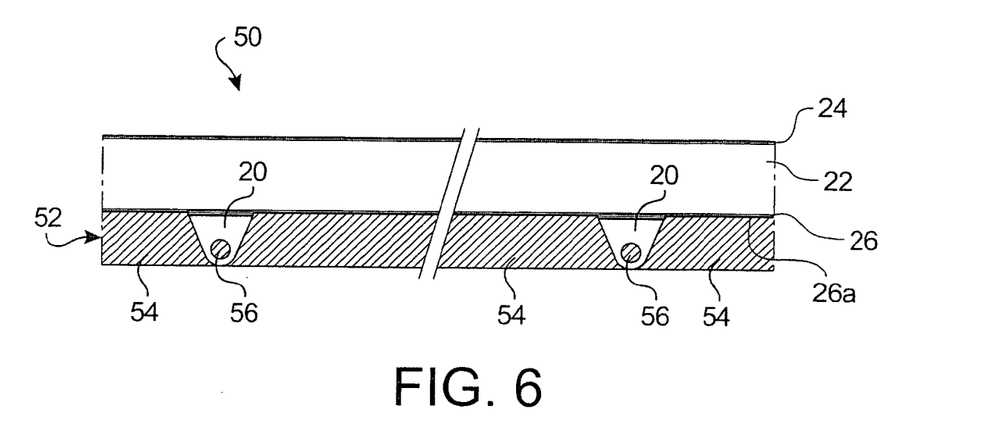
FIG. 6 shows a side view diagrammatically showing the machining step for the single piece assembly shown on FIGS. 4 and 5, made during implementation of the first preferred embodiment of the method according to the invention.

FIGS. 4 to 6 diagrammatically illustrate different steps in a first preferred embodiment of the manufacturing process according to the invention, use of this first preferred embodiment making it possible to obtain a seat rail 8 like that shown on FIGS. 2 and 3.

With reference to FIGS. 4 and 5 jointly, a first step consists firstly of making a single piece assembly 50 comprising the web 22, the top flange 24 and the bottom flange 26, and a plate 52 parallel to the web 22 and projecting from the outer surface 26 of the bottom flange 26. Naturally, the plate 52 extends over a length identical to the length of elements 22, 24 and 26, also corresponding to the length of the final rail 8, and possibly up to 10 m or more.

Note that this step is preferably done by rolling, such that finishing operations may naturally be performed on elements 22, 24 and 26 obtained after this step.

Furthermore, as the connection devices 20 required need to be in line with the web 22 as shown on FIG. 3, the plate 52 of the assembly 50 is also located along the same line as web 22, namely in a plane perpendicular to flanges 24, 26, while being separated from this web 22 by the bottom flange 26.

This plate 52 is intended to form the connection devices 20 after machining, as shown diagrammatically on FIG. 6 in which the cross-hatched parts 54 and 56 of the single piece assembly 50 indicate portions of the plate 52 to be eliminated by machining to show the connection devices 20, and the associated through orifices 32. Note that in this first preferred embodiment, the machining step of the plate 52 is done such that all removed parts 54, namely parts that expose the connection devices 20 and not the through orifices 32, extend as far as the outer surface 26*a* of the top flange 26. Thus, after this machining step, the only remaining elements of the plate 52 are the connection devices 20 projecting from the outer surface 26*a* of the bottom flange 26.

Note for information that the seat attachment means 28 are not shown on FIGS. 4 to 6, but they could naturally be provided on the single piece assembly 15 above the top flange 24, without departing from the scope of the invention. Note also that the thickness e of the plate 52 of the single piece assembly 50 is preferably exactly the same as the thickness of the connection devices 20, so as to facilitate and shorten the machining step. Similarly, with the same purpose of facilitating the machining operation of the plate 52, the height of the plate H may be identical to the height of the connection devices 20.

Figure 7:
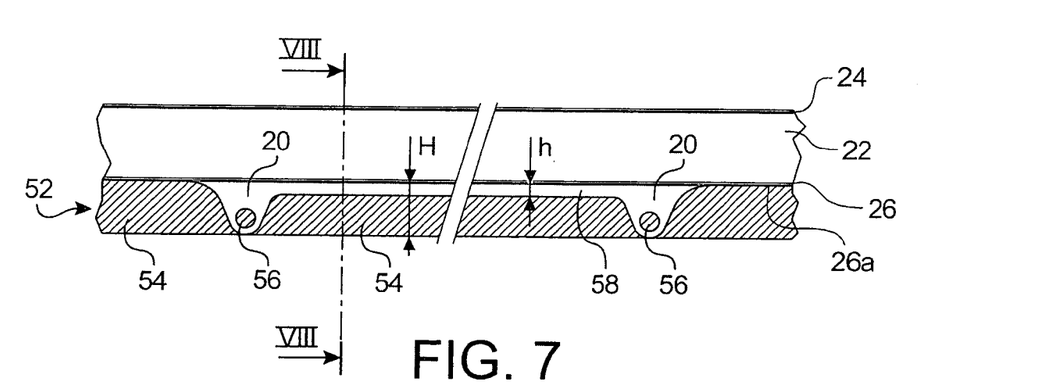
FIG. 7 shows a side view diagrammatically showing the machining step for the single piece assembly shown on FIGS. 4 and 5, made during implementation of a second preferred embodiment of the method according to the invention.
Figure 8:
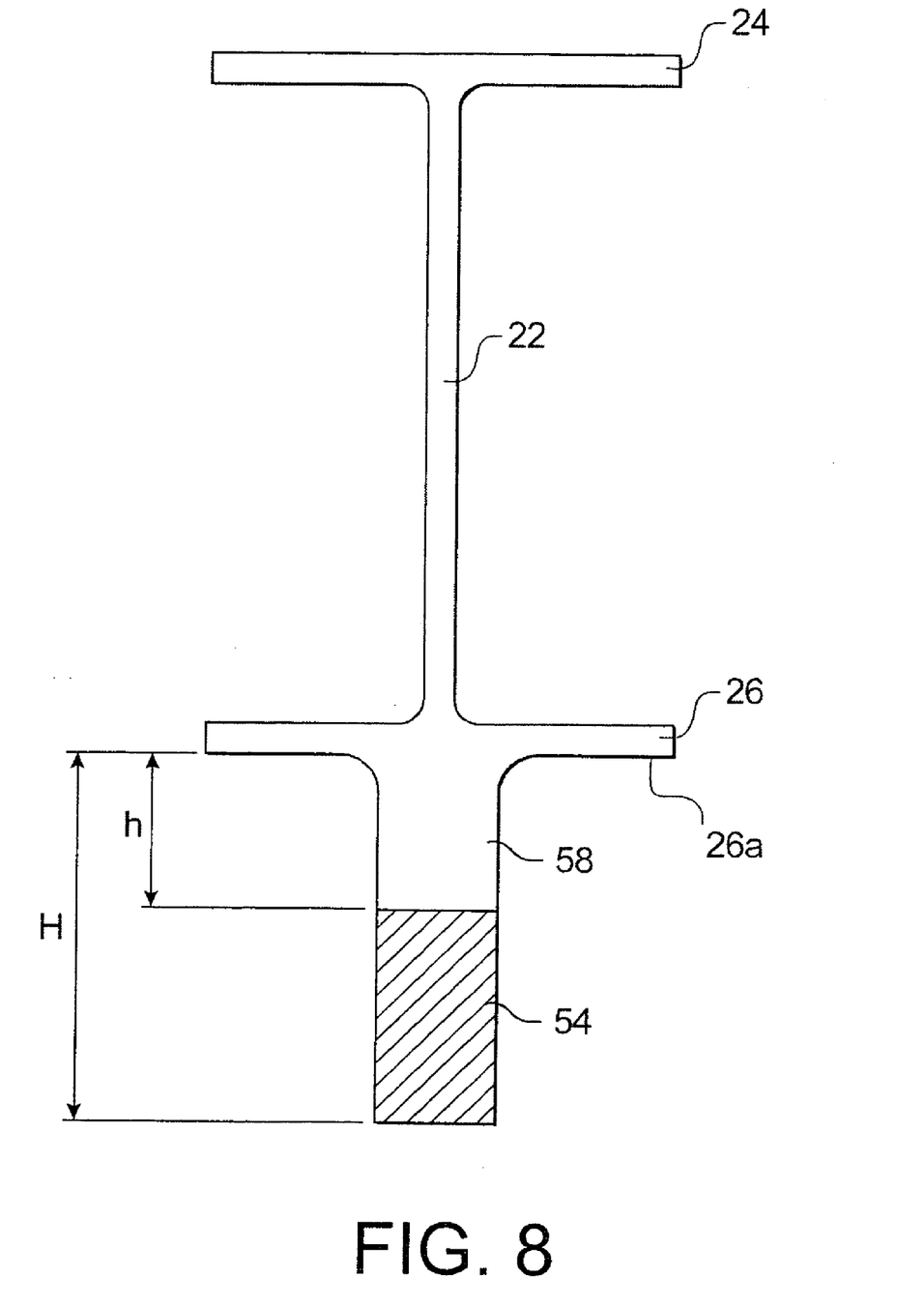
FIG. 8 is a sectional view taken along line VIII—VIII in FIG. 7.

In the second preferred embodiment of a manufacturing method according to the invention, a single piece assembly 50 is firstly made in the same way as is indicated in the description of the first preferred embodiment.

Only the latter step to machine the plate 52 is different from the step described above, in that it is made such that at least one of the eliminated parts 54, namely those that expose the connection devices 20 and not the through orifices 32, does not extend as far as the outer surface 26*a* of the top flange 26. Thus, after this machining step, the connection devices 20 projecting from the outer surface 26*a* of the bottom flange 26 are no longer the only remaining elements of plate 52, since some of them are connected by a strip of unmachined material 58 extending from the same outer surface 26*a* over a height h less than the height H of the connection devices 20 and the plate 52. Naturally, as can be seen on FIGS. 7 and 8, the heights h and H are measured along a direction perpendicular to the flanges 24, 26, which themselves are parallel to the floor 4 when the rails 8 are installed on the aircraft.

Note that the fact of providing such a strip of material 58 connecting two directly consecutive connection devices 20 and being made in a single piece with the other elements of the rail 8 within a thickness equal to the thickness of the connection devices 20, increases the longitudinal stiffness of the rail assembly 8, so that it can be made to be extremely long.

Obviously, those skilled in the art could make various modifications to the seat rails 8 for an aircraft cabin and the methods of manufacturing seat rails that have just been described above as non-limitative examples only.

The invention claimed is:

1. A seat rail for an aircraft cabin, said seat rail comprising:
   a web located between a top flange and a bottom flange, both said top and bottom flanges being arranged perpendicular to said web, said bottom flange having an outer surface and an inner surface fixed to said web, said top flange also with an outer surface and an inner surface fixed to said web, said outer surface of the top flange being fixed to a seat attachment device configured to attach a seat of said aircraft cabin to said seat rail; and a plurality of connection devices spaced along said rail and each having a form of a tenon, said connection devices being configured to attach said seat rail onto an aircraft structure and being made in a single piece with the web, the top and bottom flanges and said seat attachment device, each connection device having at least one through orifice and projecting from said outer surface of the bottom flange.

2. The seat rail for an aircraft cabin according to claim 1, wherein each connection device is approximately in line with the web, and is separated from said web by said bottom flange.

3. The seat rail for an aircraft cabin according to claim 1, wherein said seat rail is made of aluminium or an aluminium alloy.

4. The seat rail according to claim 1, wherein said seat attachment device defines a groove configured to slidably receive seat legs of said seat.

5. The seat rail according to claim 1, wherein each connection device is located along a same plane.

6. The seat rail according to claim 1, wherein said connection devices do not have a same thickness as said web.

7. The seat rail according to claim 6, wherein said connection devices and said web are arranged approximately in a same plane.

8. The seat rail according to claim 1, wherein said connection devices and said web are arranged approximately in a same plane perpendicular to said top flange.

9. The seat rail according to claim 1, wherein said tenon is flat.

10. The seat rail according to claim 9, wherein said tenon is triangular.

11. The seat rail according to claim 1, wherein said aircraft structure comprises a clevis.

12. The seat rail according to claim 11, wherein said clevis defines two orifices in line with said at least one through orifice of said each connection device.

* * * * *